US011087000B2

(12) United States Patent
Van Nieuwenhuyze et al.

(10) Patent No.: US 11,087,000 B2
(45) Date of Patent: *Aug. 10, 2021

(54) CONTROLLED STARTING OF AN ELECTRONIC CIRCUIT

(71) Applicant: Proton World International N.V., Diegem (BE)

(72) Inventors: Olivier Van Nieuwenhuyze, Wezembeek-Oppem (BE); Christophe Henri Ricard, Santa Clara, CA (US)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,656

(22) Filed: Nov. 19, 2018

(65) Prior Publication Data

US 2019/0087584 A1 Mar. 21, 2019

Related U.S. Application Data

(63) Continuation of application No. 15/139,820, filed on Apr. 27, 2016, now Pat. No. 10,169,588.

(30) Foreign Application Priority Data

Nov. 3, 2015 (FR) ...................................... 1560511

(51) Int. Cl.
*G06F 21/57* (2013.01)
*G06F 21/64* (2013.01)
(Continued)

(52) U.S. Cl.
CPC .............. *G06F 21/575* (2013.01); *G06F 1/26* (2013.01); *G06F 21/64* (2013.01); *G06F 21/81* (2013.01); *G06F 2221/034* (2013.01)

(58) Field of Classification Search
CPC .......... G06F 21/575; G06F 21/64; G06F 1/26; G06F 21/81; G06F 2221/034; G06F 21/77; G06F 21/72
(Continued)

(56) References Cited

U.S. PATENT DOCUMENTS 7,690,027 B2 3/2010 Sandberg
7,809,948 B2 10/2010 Lewis et al.
(Continued)

FOREIGN PATENT DOCUMENTS

EP 2 164 017 A2 3/2010

OTHER PUBLICATIONS

French Preliminary Search Report, dated Jun. 24, 2016, for French Application No. 1560511, 2 pages.
(Continued)

*Primary Examiner* — Jahangir Kabir
(74) *Attorney, Agent, or Firm* — Seed IP Law Group LLP

(57) ABSTRACT

A method of checking the authenticity of the content of a non-volatile memory of an electronic device including a microcontroller and an embedded secure element includes starting the microcontroller with instructions stored in a first non-reprogrammable memory area associated with the microcontroller, starting the secure element, executing, with the secure element, a signature verification on the content of a second reprogrammable non-volatile memory area associated with the microcontroller, and interrupting the microcontroller power supply if the signature is not verified.

20 Claims, 2 Drawing Sheets

(51) Int. Cl.
*G06F 21/81* (2013.01)
*G06F 1/26* (2006.01)

(58) Field of Classification Search
USPC .................................................. 726/4, 26
See application file for complete search history.

(56) References Cited

U.S. PATENT DOCUMENTS

| | | | |
|---|---|---|---|
| 8,332,653 B2* | 12/2012 | Buer | G06F 21/575 |
| | | | 713/189 |
| 9,568,983 B1 | 2/2017 | Lachwani | |
| 9,626,512 B1* | 4/2017 | Brandwine | G06F 21/57 |
| 9,946,899 B1 | 4/2018 | Wesson et al. | |
| 10,084,603 B2* | 9/2018 | Rogers | H04L 9/3234 |
| 10,211,985 B1* | 2/2019 | Brandwine | G06F 21/575 |
| 10,243,739 B1* | 3/2019 | Brandwine | H04L 9/0643 |
| 10,275,599 B2* | 4/2019 | Collart | G06F 21/57 |
| 10,733,284 B2* | 8/2020 | Broumas | G06F 21/53 |
| 2003/0120922 A1 | 6/2003 | Sun et al. | |
| 2004/0243801 A1 | 12/2004 | Chen et al. | |
| 2005/0076226 A1 | 4/2005 | Boivie et al. | |
| 2005/0081040 A1 | 4/2005 | Johnson et al. | |
| 2005/0132217 A1* | 6/2005 | Srinivasan | G06F 21/51 |
| | | | 726/22 |
| 2008/0148036 A1 | 6/2008 | Westerinen et al. | |
| 2009/0259854 A1* | 10/2009 | Cox | G09G 5/001 |
| | | | 713/189 |
| 2009/0265536 A1 | 10/2009 | Filee et al. | |
| 2012/0272071 A1* | 10/2012 | Muir | G06F 21/575 |
| | | | 713/189 |
| 2013/0223623 A1 | 8/2013 | Jooste et al. | |
| 2014/0205092 A1* | 7/2014 | Hartley | H04L 9/0897 |
| | | | 380/44 |
| 2015/0089214 A1 | 3/2015 | Dupré | |
| 2015/0095644 A1 | 4/2015 | Gupta et al. | |
| 2016/0055113 A1 | 2/2016 | Hodge et al. | |
| 2016/0171223 A1* | 6/2016 | Covey | G06F 9/4401 |
| | | | 713/189 |
| 2017/0291593 A1 | 10/2017 | Iwagami et al. | |
| 2020/0184078 A1* | 6/2020 | Hinrichs | H04L 9/3268 |

OTHER PUBLICATIONS

French Preliminary Search Report, dated Jul. 1, 2016, for French Application No. 1560510, 2 pages.
Menezes et al., Handbook of Applied Cryptography, CRC Press, Boca Raton, USA, 1996, pp. 489-541. (54 pages).

* cited by examiner

CONTROLLED STARTING OF AN ELECTRONIC CIRCUIT

BACKGROUND

Technical Field

The present disclosure generally relates to electronic circuits and, more particularly, to devices comprising a processor and an embedded secure element. The present disclosure more particularly applies to controlling the authenticity of all or part of the instructions contained in the processor at the starting of the device.

Description of the Related Art

Many electronic devices, for example, cell phones, electronic keys (dongles), etc., are equipped with microprocessors for processing data and executing various applications. Among such applications, some are now associated with operations requiring preserving the security of the exchanged data, for example, payment, access control, and other operations.

More significant devices, for example, computers, video decoding boxes (Set Top Box), etc., comprise trusted platform modules (TPM) which enable protection of the content of instruction memories and in particular checking that a code or program to be executed has not been corrupted. Such modules are absent from less elaborate devices such as, for example, cell phones, electronic keys, and connected objects (connected watch, access dongle, etc.).

Electronic devices, even if they comprise no secure platform module, are however more and more often equipped with embedded secure elements, which actually are integrated circuits representing the security functions of microcircuit cards (smartcard, SIM, etc.). For example, such secure elements contain the microcircuit card emulation application which provides the security authentication service for payment, access control, and other operations.

BRIEF SUMMARY

It would be desirable to be able to secure the starting of an electronic device to control that the code or the data that it contains are authentic or non-corrupted.

An embodiment provides a solution overcoming all or part of the disadvantages of known techniques of microprocessor starting in an electronic device.

An embodiment provides protecting an embedded secure element associated with a microprocessor in an electronic device.

An embodiment provides a method of checking the authenticity of the content of a non-volatile memory of an electronic device comprising a microcontroller and an embedded secure element, comprising:

starting the microcontroller with instructions stored in a first non-reprogrammable memory area associated with the microcontroller;

starting the secure element;

executing, with the secure element, a signature verification on the content of a second reprogrammable non-volatile memory area associated with the microcontroller; and interrupting the power supply of the microcontroller if the signature is not verified.

According to an embodiment, if the signature is verified, the secure element sends a message of validation of the content of the second area to the microcontroller.

According to an embodiment, the microcontroller waits for a response from the secure element to execute instructions contained in the second area.

According to an embodiment, in case of an authentic update of the content of the second area, the signature stored in the secure element is accordingly modified.

According to an embodiment, at the starting of the secure element, the latter monitors the arrival of a request originating from the microcontroller so as to, in the case where this request does not arrive after a given time, cause the interruption of the microcontroller power supply.

An embodiment provides an electronic device comprising:

a microcontroller;

an embedded secure element; and a switch for interrupting the microcontroller power supply on request of the embedded secure element.

According to an embodiment, an intermediate circuit is interposed between the microcontroller and the secure element.

According to an embodiment, the microcontroller and the secure element are capable of implementing the above method.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
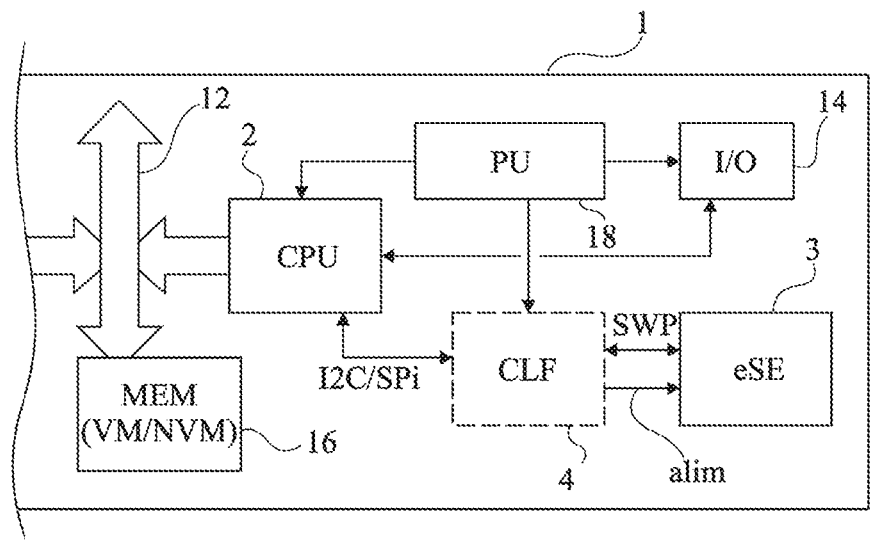
FIG. 1 is a very simplified representation in the form of blocks of an embodiment of an electronic device equipped with a microcontroller and with an embedded secure element.

The same elements have been designated with the same reference numerals in the different drawings.

For clarity, only those steps and elements which are useful to the understanding of the embodiments which will be described have been shown and will be detailed. In particular, the applications of the electronic device have not been detailed, the described embodiments being compatible with usual applications of such devices. Further, protocols of signal exchange between the different elements of the electronic device have not been detailed either, the described embodiment being, here again, compatible with currently-used protocols. In the following description, when reference is made to terms approximately, about, and in the order of, this means to within 10%, preferably to within 5%.

FIG. 1 very schematically shows, in the form of blocks, an example of an electronic device 1 of the type to which the embodiments which will be described apply.

Device 1, for example, a cell phone, an electronic key, etc., comprises a microcontroller 2 (CPU—Central Processing Unit) in charge of controlling all or part of the programs and applications executed in the device. Microcontroller 2 communicates, via one or a plurality of address, data, and control buses 12, with different electronic circuits and peripherals (not shown) of device 1, for example, display control circuits, of a keyboard, etc., as well as with various wired or wireless input-output interfaces 14 (I/O) (for example, Bluetooth). Microcontroller 2 generally integrates volatile and non-volatile memories and also processes the content of similar memories 16 (MEM (VM/NVM)) of device 1. Microcontroller 2 and various circuits of device 1 are powered by a power unit 18 (PU). For example, unit 18 is a battery, possibly associated with a voltage regulator.

In applications targeted by the present disclosure, device 1 further comprises an embedded secure element 3 (for example, eSE—embedded Secure Element or eUICC—embedded Universal Integrated Circuit Card) which includes a secure microprocessor. Element 3 is intended to contain the secure services or applications of the electronic device, for example, payment, access control, and other applications.

Possibly, an intermediate element or circuit 4, for example, a near-field communication controller 4 (NFC), also called contactless front end (CLF), a Bluetooth controller, etc., equips device 1. Element 4 (illustrated in dotted lines in FIG. 1) is capable of being used by microcontroller 2, for example by connections of twin-wire type (I2C or SPI) and, by element 3, by a connection of single-wire type (SWP—Single Wire Protocol).

According to the voltage level withstood by secure element 3, said element is either powered by unit 18 or, as shown in FIG. 1, by element 4, which is itself powered by unit 18. For example, the case of a microcontroller 2 and of a contactless communication controller 4 powered under a voltage in the order of 3 volts by unit 18 and of an element 3 powered under a voltage in the order of 1.8 volt (PWR) by controller 4 can be considered. The need for a power supply by NFC controller 4 may be due to the levels used by the communication protocols between the controller and secure element 3.

It is provided to take advantage of the presence of embedded secure element 3 to check the authenticity of the content (data, instructions, etc.) of all or part of the memories associated with microcontroller 2.

Figure 2:
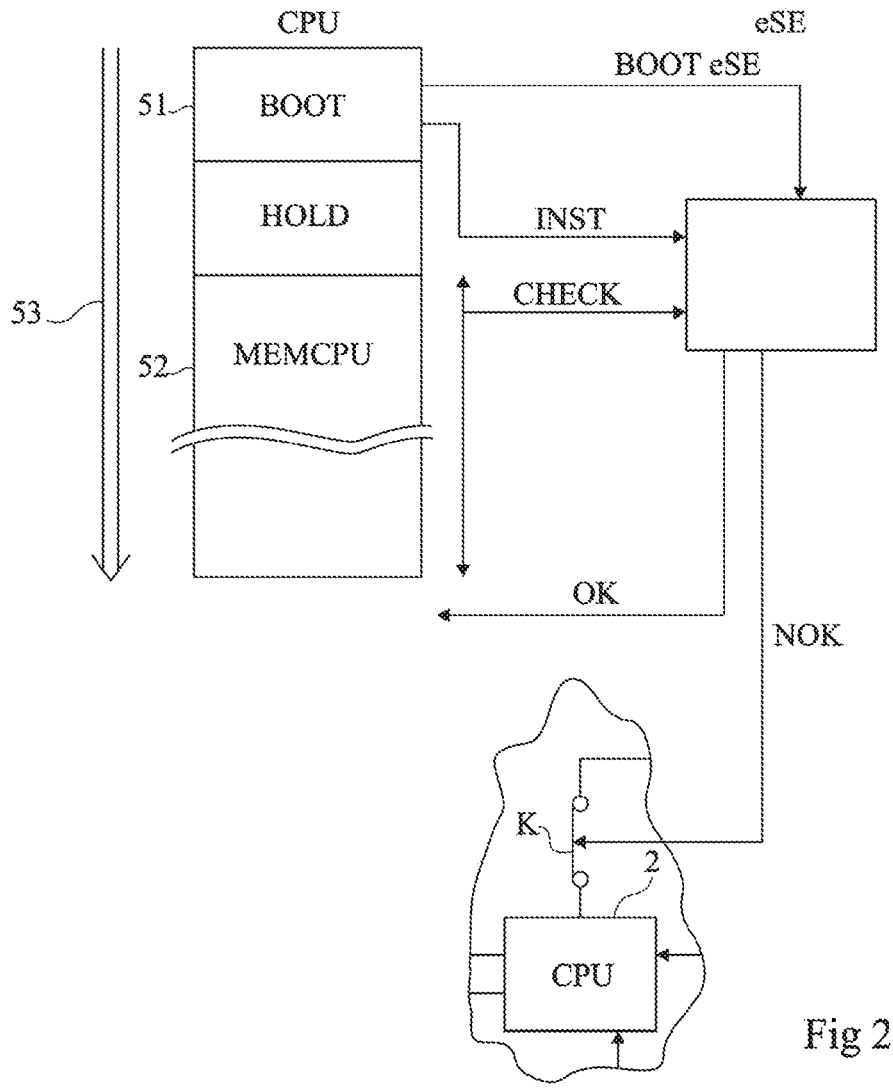
FIG. 2 is a simplified representation illustrating an embodiment of a start-up sequence of the microcontroller of the electronic device of FIG. 1.

FIG. 2 is a simplified representation illustrating an embodiment of a start-up sequence of microcontroller 2 of electronic device 1 of FIG. 1.

Risks inherent to the starting of microcontroller 2 in terms of data security are that, in the case where the microcontroller code (program) is pirated, the data of the embedded secure element risk being pirated. This risk occurs at the start, called cold boot, which follows a powering-on since not all the mechanisms for controlling the access to the different circuits have been initialized yet and, in particular, the configuration of the memories in free areas and reserved areas. The problem is not as critical in the case of a "hot" reset of the device, that is, with no interruption of the microcontroller power supply, since such memory area configuration mechanisms are generally untouched. However, the described embodiment may also be implemented in case of a partial or total deleting of the memory on reset.

At a starting (powering-on of the electronic circuits of the device) or a reset with an interruption of the power supply, microcontroller 2 starts by accessing a set area 51 (BOOT) of its non-volatile memory containing a code (a start-up program). Area 51 generally is a read-only memory area, that is, non-volatile and non-reprogrammable (sometimes called "immutable"). It is thus set on manufacturing and does not risk being modified by a possible pirate. Indeed, the memory areas 52 (MEMCPU) which should be protected are non-volatile memory areas which will be exploited by microcontroller 2 when applications will need accessing element 3. Such areas 52 also contain code (instructions) and data, which are reprogrammable according to applications. If a pirate succeeds in storing an attack code in these areas, he/she risks being able to access secure element 3.

The start-up code 51 executed by the microcontroller contain an instruction for starting secure element 3 (i.e., a function, Fn(BOOT) of eSE) as well as, subsequently in the sequencing of the initialization process (illustrated by an arrow 53), an instruction INST for starting a process of checking or verification of the content of area 52 by element 3. Once instruction INST is communicated by microcontroller 2 to element 3, microcontroller 2 sets to a hold mode (HOLD) where it waits for a response from secure element 3. As long as it does not receive this response, it does not carry on the execution of the code that it contains.

The checking CHECK performed by element 3 comprises reading all or part of area 52 and executing an authenticity check mechanism. For example, this mechanism is a signature calculation based on the code and data contained in area 52, and for checking this signature against a reference signature stored in element 3. In this case, in case of an authorized modification of the content of area 52, the reference signature stored in element 3 is updated to allow subsequent authenticity checks.

If element 3 validates the authenticity of the content of area 52, it responds (OK) to microcontroller 2. The latter can then leave its hold mode and execute the rest of the initialization based on the content of area 52.

However, if element 3 does not validate (NOK) the content of area 52, it causes, via a switch K interposed on the power supply line of microcontroller 2, an interruption of this power supply. This then forces the microcontroller to be restarted and the above-described steps are repeated. If the error originates from a transient malfunction, the next execution validates the starting. However, if the code contained in area 52 effectively poses a problem (be it after an attack or after a memory problem), microcontroller 2 will successively start, for example, until battery 18 is out or endlessly as long as device 1 is connected, but without ever passing start phase BOOT.

Preferably, at the starting of element 3 (Fn(BOOT) eSE), the latter monitors the arrival of a request (instruction INST) originating from microcontroller 2. In the case where this request does not arrive after a certain time, determined relatively to the usual time between the start and the arrival or request INST (for example, in the order of some hundred milliseconds), element 3 causes the interruption of the power supply of microcontroller 2. This provides additional security in case of a disturbance of start program BOOT of the microcontroller.

Figure 3:
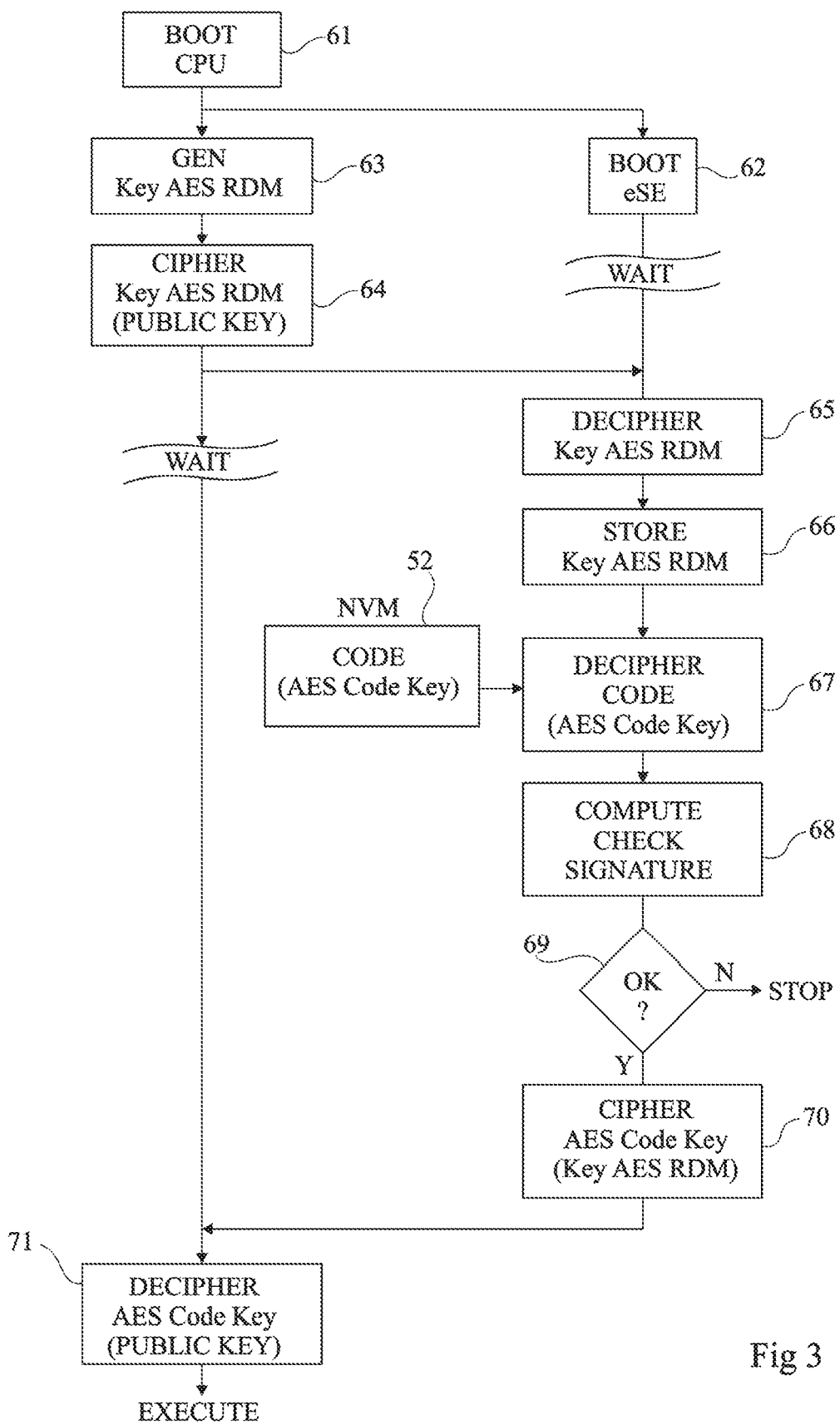
FIG. 3 is a simplified representation illustrating another embodiment of a start-up sequence of the microcontroller of the electronic device of FIG. 1.

FIG. 3 is a simplified representation illustrating another embodiment of a start-up sequence of the microcontroller of the electronic device of FIG. 1.

According to this embodiment, everything is performed by exchange of messages between microcontroller 2 and secure element 3, without necessarily acting on (interrupting) the microcontroller power supply.

The starting of microcontroller 2 and of secure element 3 is caused in the same way as in the previous embodiment, that is, at the starting (block 61, BOOT CPU) of microcontroller 2, the latter cases the starting (block 62, BOOT eSE) of secure element 3. Once it has started, element 3 sets to a mode where it waits for an instruction (WAIT).

Further, the checking of the content of area 52 or of the non-volatile memory areas (NVM) containing code to be checked is also performed, preferably, by a signature check by element 3.

According to the embodiment of FIG. 3, the code and the fixed data, stored in non-volatile memory 52 and forming the data of initialization of microcontroller 2 after the starting thereof, are ciphered. The ciphering used is for example a symmetrical AES-type ciphering. However, instead of being stored in microcontroller 2, the ciphering key is stored in secure element 3.

Once microcontroller 2 has started (end of block 61) and it has given a start instruction to element 3, it generates a key (block 63, GEN KeyAESRDM), preferably a random number of the size of the AES used to cipher the code.

Microcontroller 2 then transmits key KeyAESRDM to the secure element. Preferably, this transmission is performed by a public key mechanism, the microcontroller ciphering key KeyAESRDM with the public key of the algorithm (block 64, CIPHER KeyAESRDM (PUBLIC KEY)). Preferably, microcontroller 2 does not store random number KeyAESRDM in the non-volatile memory. Indeed, it is sufficient for it to store this number in the volatile memory, which decreases risks of attack. Once key KeyAESRDM has been transmitted, the microcontroller sets to the waiting mode (WAIT).

Element 3 deciphers KeyAESRDM by means of the public key mechanism (block 65, DECIPHER KeyAESRDM)) and stores it (block 66, STORE KeyAESRDM).

Element 3 then deciphers (block 67, DECIPHER CODE (AESCodeKey) the code contained in area 52 of the non-volatile memory of microcontroller 2 (or associated therewith) and calculates and checks (block 68, COMPUTE/CHECK SIGNATURE) the code signature.

If the signature is incorrect (output N of block 69, OK?), element 3 does not respond to microcontroller 2 and the operation thereof is stopped (STOP).

If the signature is correct (output Y of block 69), element 3 ciphers key AESCodeKey with key KeyAESRDM (block 70, CIPHER AESCodeKey (KeyAESRDM)) and sends it to microcontroller 2. The latter deciphers key AESCodeKey (block 71, DECIPHER AESCodeKey (PUBLIC KEY)) with key KeyAESRDM.

Microcontroller 2 then uses key AESCodeKey to decipher the code contained in area 52 and to execute it (EXECUTE). However, key AESCodeKey is not stored in the non-volatile memory by microcontroller 2. Thus, on the side of microcontroller 2, number KeyAESRDM and key AESCodeKey are only stored in volatile storage elements (RAM, registers, or the like).

According to an alternative embodiment, key AESCodeKey is generated by secure element 3 for each change of signature of the code contained in area 52, that is, each time this code is modified.

According to another variation, on manufacturing of the circuits (of microcontroller 2 and of secure element 3), the ciphering code of memory 52 of the microcontroller is generated by secure element 3. This means that code AESCodeKey varies from one device 1 to another.

Preferably, the asymmetric key (pair of public and private key) is unique per pair of microcontroller component 2/secure element 3.

It should be noted that the two embodiments and their respective variations may be combined. For example, in case of an authentication failure according to the second embodiment (output N of block 69, FIG. 3), it may be provided for the secure element to interrupt the microcontroller power supply according to the embodiment described in relation with FIG. 2.

Various embodiments have been described. Various modifications will occur to those skilled in the art. In particular, the selection of the memory areas having a content to be checked depends on the application and may vary. Further, the selection of the data exchange ciphering processes between the secure element and the microcontroller also depends on applications. Further, the practical implementation of the embodiments which have been described is within the abilities of those skilled in the art by using on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    starting a microcontroller of an electronic device by executing, using the microcontroller, instructions stored in a non-reprogrammable memory area of a non-volatile memory of the electronic device, the non-reprogrammable memory area being associated with the microcontroller;
    starting a boot sequence in a secure element embedded in the electronic device, the secure element including a microprocessor excuting the boot sequence, wherein the secure element is separate from the non-reprogrammable memory area storing the instructions;
    verifying, with the microprocessor of the secure element, a signature generated by the microprocessor of the secure element from content stored in a reprogrammable memory area of the non-volatile memory, the reprogrammable memory area being associated with the microcontroller; and
    interrupting, under control of the microprocessor of the secure element, a power supply of the microcontroller in response to the verifying indicating the signature is not verified.

2. The method of claim 1, comprising:
    responding, with the microprocessor of the secure element, to the verifying indicating the signature is verified, by sending a message of validation of the content of the reprogrammable memory area to the microcontroller.

3. The method of claim 1, comprising:
    waiting, by the microcontroller, for a response from the secure element after the starting of the microcontroller; and
    executing, by the microcontroller, instructions contained in the reprogrammable memory area after receiving the response from the secure element.

4. The method of claim 1, comprising:
determining that an update of the content of the reprogrammable memory area is authentic; and
based on the determination, modifying a signature stored in the secure element and used in the verification.

5. The method of claim 1, comprising:
after starting the microcontroller, monitoring with the secure element whether a request originating from the microcontroller is received; and
in response to a determination that a request from the microcontroller was not received within a threshold period of time, causing an interruption of a power supply of the microcontroller.

6. The method of claim 1, comprising:
responding to a deleting of one or more areas of the non-volatile memory on a hot reset of the microcontroller by:
starting the boot sequence in the secure element embedded in the electronic device;
verifying, with the secure element, a signature generated by the secure element from content stored in the reprogrammable memory area of the non-volatile memory; and
interrupting the power supply of the microcontroller in response to the verifying indicating the signature is not verified.

7. An electronic device, comprising:
a non-volatile memory;
a microcontroller, which, in operation, executes start-sequence instructions stored in a non-reprogrammable memory area of the non-volatile memory, the non-reprogrammable area being associated with the microcontroller;
a power supply, which, in operation, supplies power to the microcontroller; and
an embedded secure element including a microprocessor and separate from the ion-volatile memory, wherein the microprocessor of the secure element, in operation, responds to execution of the start-sequence instructions by the microcontroller by:
starting a boot sequence;
verifying a signature generated by the secure element from content stored in a reprogrammable memory area of the non-volatile memory, the reprogrammable area being associated with the microcontroller; and
initiating an interruption of power supplied to the microcontroller by the power supply in response to a determination that the signature is not verified.

8. The electronic device of claim 7, comprising:
an intermediate circuit interposed between the microcontroller and the embedded secure element.

9. The electronic device of claim 8 wherein the intermediate circuit is a wireless transceiver circuit.

10. The electronic device of claim 7, wherein the electronic device is a cell phone.

11. The electronic device of claim 10 wherein the microprocessor of the embedded secure element, in operation, responds to a deleting of one or more areas of the non-volatile memory on a hot reset of the microcontroller by:
starting the boot sequence in the secure element embedded in the electronic device;
verifying, with the secure element, a signature generated by the secure element from content stored in the reprogrammable memory area of the non-volatile memory; and
interrupting the power supply of the microcontroller in response to the verifying indicating the signature is not verified.

12. A method, comprising:
executing, using a microcontroller of a mobile device, instructions retrieved from a non-reprogrammable memory area of a non-volatile memory of the mobile device;
directing a secure element of the mobile device to execute a verification operation, wherein the secure element includes a microprocessor to execute the verification operation and the verification operation executed by the microprocessor of the secure element includes:
verifying a signature calculated by the secure element based on content stored in a reprogrammable memory area of the non-volatile memory, the reprogrammable memory area being associated with the microcontroller of the mobile device; and
in response to a determination that the signature is not verified, interrupting a power supply of the microcontroller; and
waiting, by the microcontroller, for an indication from the microprocessor of the secure element that that the signature has been verified.

13. The method of claim 12, comprising:
after receiving the indication from the secure element that that the signature has been verified, executing, by the microcontroller, instructions retrieved from the reprogrammable memory area.

14. The method of claim 12, comprising:
authenticating an update of content of the reprogrammable memory area; and
directing the secure element to recalculate a stored signature associated with the reprogrammable memory area.

15. The method of claim 12 wherein the direction to the secure element to execute the verification operation is passed through an intermediate communications circuit.

16. The method of claim 12 wherein interrupting the power supply includes the secure element controlling a switch interposed between the power supply and the microcontroller.

17. A non-transitory computer-readable medium having contents which cause a microprocessor of a secure element of an electronic device to perform a method, the method comprising:
responding to executing by a microcontroller of the device of start-sequence instructions stored in a non-reprogrammable memory area of a non-volatile memory of the device, the non-reprogrammable area being associated with the microcontroller, by:
starting a boot sequence using the microprocessor of the secure element;
verifying, using the microprocessor of the secure element, a signature generated by the secure element from content stored in a reprogrammable memory area of the non-volatile memory, the reprogrammable area being associated with the microcontroller; and
initiating, under control of the microprocessor of the secure element, an interruption of power supplied to the microcontroller in response to a determination that the signature is not verified.

18. The non-transitory computer-readable medium of claim 17 wherein the method comprises:
responding, by the microprocessor of the secure element, to the verifying indicating the signature is verified, by sending a message of validation of the content of the reprogrammable memory area to the microcontroller.

19. The non-transitory computer-readable medium of claim 17 wherein the method comprises:
   determining that an update of the content of the reprogrammable memory area is authentic; and
   based on the determination, modifying a signature stored in the secure element.

20. The non-transitory computer-readable medium of claim 17 wherein the method comprises:
   responding to a deleting of one or more areas of the non-volatile memory on a hot reset of the microcontroller by:
      starting the boot sequence in the secure element embedded in the electronic device;
      verifying, with the secure element, a signature generated by the secure element from content stored in the reprogrammable memory area of the non-volatile memory; and
      interrupting the power supply of the microcontroller in response to the verifying indicating the signature is not verified.

* * * * *

UNITED STATES PATENT AND TRADEMARK OFFICE
CERTIFICATE OF CORRECTION

PATENT NO. : 11,087,000 B2
APPLICATION NO. : 16/195656
DATED : August 10, 2021
INVENTOR(S) : Olivier Van Nieuwenhuyze et al.

It is certified that error appears in the above-identified patent and that said Letters Patent is hereby corrected as shown below:

In the Claims

Column 6, Claim 1, Line 42:
"excuting" should read: --executing--.

Column 6, Claim 1, Lines 43-44:
"non-reprogramable" should read: --non-reprogrammable--.

Column 7, Claim 7, Line 38:
"the ion-volatile memory," should read: --the non-volatile memory,--.

Column 8, Claim 12, Line 23:
"element that that the" should read: --element that the--.

Column 8, Claim 13, Lines 26-27:
"element that that the" should read: --element that the--.

Signed and Sealed this
Third Day of May, 2022

Katherine Kelly Vidal
*Director of the United States Patent and Trademark Office*